No. 782,130. PATENTED FEB. 7, 1905.
A. B. HENDRYX.
FISHING REEL.
APPLICATION FILED APR. 16, 1904.

No. 782,130. Patented February 7, 1905.

UNITED STATES PATENT OFFICE.

ANDREW B. HENDRYX, OF NEW HAVEN, CONNECTICUT.

FISHING-REEL.

SPECIFICATION forming part of Letters Patent No. 782,130, dated February 7, 1905.

Application filed April 16, 1904. Serial No. 203,448.

*To all whom it may concern:*

Be it known that I, ANDREW B. HENDRYX, of New Haven, in the county of New Haven and State of Connecticut, have invented a new and useful Improvement in Fishing-Reels; and I do hereby declare the following, when taken in connection with the accompanying drawings and the letters of reference marked thereon, to be a full, clear, and exact description of the same, and which said drawings constitute part of this specification, and represent, in—

Figure 1:
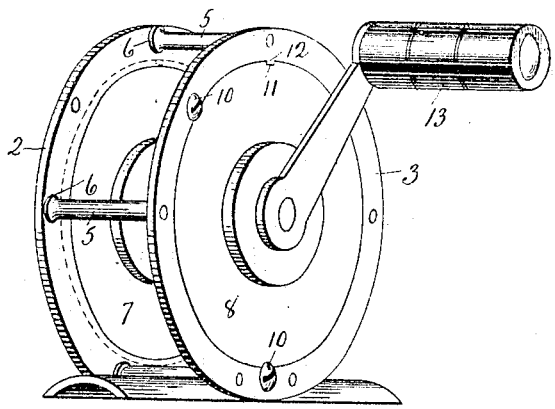
Figure 2:
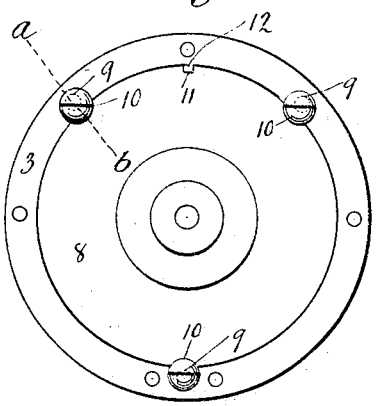
Figure 3:
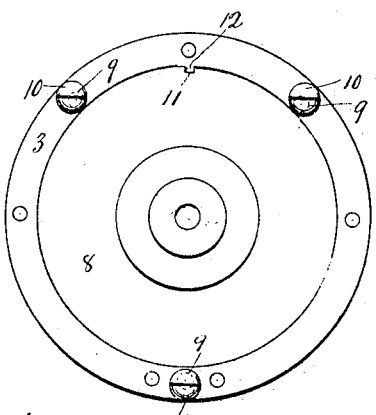
Figure 4:
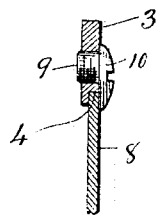

Figure 1, a perspective view of a reel constructed in accordance with my invention; Fig. 2, a side view of the same, showing the removable plate united with the ring by the eccentric screws; Fig. 3, a similar view with the screws turned to release the plate; Fig. 4, a sectional view on the line *a b* of Fig. 2.

This invention relates to an improvement in fishing-reels.

In the more general construction of reels the plates between which the spools are mounted are each connected by screws with posts which unite the plates; but in the assemblance of reels it is often necessary to remove the plates, and hence more or less difficulty is experienced in bringing them into proper alinement for the perfect bearing of the spool.

The object of this invention is to avoid the screw connection between the plates; and the invention consists in the construction as hereinafter described, and particularly recited in the claim.

In carrying out my invention I employ two rings 2 3, formed in their outer faces at their inner edges with annular shoulders 4. These rings are connected together by posts 5, having shoulders 6 at opposite ends, whereby the distance between the rings is fixed, the outer ends of the posts being riveted down upon the outer faces of the rings, so as to permanently connect them together. With these rings I employ plates 7 8, adapted to be seated upon the shoulders 4 and so as to closely fit the rings 2 3 and of a thickness to stand flush with the outer face therewith, as clearly shown in Fig. 4. To secure these plates in position, I employ screws 9, which extend into the faces of the rings, and provide these screws with eccentric heads 10, which will when turned extend over onto the outer faces of the plates 7 8, so as to interlock them with their respective rings.

Preferably and as herein shown the plates will be formed with small notches 11, registering with lugs 12 on the shoulders 4 of the rings, whereby the proper position of the plates is determined and whereby also the plates are held against turning in the rings. These plates contain the usual bearings for the spool and for the operating-handle 13. By thus forming the bearing-plates independent of the rings the adjustment of the parts is readily accomplished when they are assembled, and this is particularly important in automatic reels, wherein a nicety of adjustment is required and which often require the separation of the plates a number of times before the desired adjustment is secured.

Having fully described my invention, what I claim as new, and desire to secure by Letters Patent, is—

A fishing-reel comprising two rings permanently connected together, the inner edges of the outer faces of said rings formed with shoulders, plates bearing on said shoulders, and screws mounted in said ring and formed with eccentric heads adapted to overlap the face of said plates, substantially as described.

In testimony whereof I have signed this specification in the presence of two subscribing witnesses.

ANDREW B. HENDRYX.

Witnesses:
 EDWARD N. PECK,
 ARTHUR B. ALLING.